United States Patent
Kim

(10) Patent No.: US 10,880,230 B2
(45) Date of Patent: Dec. 29, 2020

(54) APPLICATION DISTRIBUTION EXECUTION SYSTEM BASED ON NETWORK SLICING, APPARATUS APPLIED THERETO, AND METHOD OF OPERATING APPARATUS

(71) Applicant: SK TELECOM CO., LTD., Seoul (KR)

(72) Inventor: Dong Hyun Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 6 days.

(21) Appl. No.: 16/175,980

(22) Filed: Oct. 31, 2018

(65) Prior Publication Data

US 2019/0132259 A1     May 2, 2019

(30) Foreign Application Priority Data

Oct. 31, 2017     (KR) .................. 10-2017-0144167

(51) Int. Cl.
| | |
|---|---|
| *G06F 15/173* | (2006.01) |
| *H04L 12/911* | (2013.01) |
| *H04L 29/08* | (2006.01) |
| *H04L 29/06* | (2006.01) |

(52) U.S. Cl.
CPC ............ *H04L 47/82* (2013.01); *H04L 47/781* (2013.01); *H04L 67/10* (2013.01); *H04L 67/16* (2013.01); *H04L 67/38* (2013.01); *H04L 67/40* (2013.01)

(58) Field of Classification Search
CPC ....... H04L 47/82; H04L 47/781; H04L 67/10; H04L 67/16; H04L 67/38; H04L 67/40
USPC ........................................................... 709/226
See application file for complete search history.

(56) References Cited

U.S. PATENT DOCUMENTS

2017/0164349 A1* 6/2017 Zhu .................. H04W 48/18

FOREIGN PATENT DOCUMENTS

| KR | 10-2017-0030058 A | 3/2017 |
| KR | 10-2017-0052446 A | 5/2017 |
| KR | 10-2017-0114923 A | 10/2017 |

OTHER PUBLICATIONS

Korean Office Action for corresponding Korean application No. 10-2017-0144167 dated Aug. 29, 2019, citing the above references.
Nokia et al., S2-176891, TS 23. 501:editorial corrections and alignment, 3GPP TSG SA WG2 #123, dated Oct. 23, 2017, cited in NPL No. 1.
Korean Office Action dated Feb. 21, 2019, in connection with counterpart Korean Patent Application No. 10-2017-0144167, citing the above references.
Korean Office Action dated Feb. 27, 2020, in connection with the Korean Patent Application No. 10-2017-0144167 citing the above reference(s).

* cited by examiner

*Primary Examiner* — Wing F Chan
*Assistant Examiner* — Joseph R Maniwang
(74) *Attorney, Agent, or Firm* — Hauptman Ham, LLP

(57) ABSTRACT

Disclosed is technology for a method of allocating different networks to respective services and users by allocating E2E network slices to a core network and a radio network and, more particularly, to technology for a new hybrid application distribution execution environment capable of realizing a virtual network environment (for example, a vDC) but allowing a data service optimized for a communication network used by a terminal to be easily provided (through API exposure).

9 Claims, 3 Drawing Sheets

APPLICATION DISTRIBUTION EXECUTION SYSTEM BASED ON NETWORK SLICING, APPARATUS APPLIED THERETO, AND METHOD OF OPERATING APPARATUS

CROSS-REFERENCE TO RELATED APPLICATIONS

This application is based upon and claims the benefit of priority from Korean Patent Application No. 10-2017-0144167, filed on Oct. 31, 2017, the entire contents of which are incorporated herein by reference.

BACKGROUND OF THE INVENTION

1. Field of the Invention

The present disclosure relates to an application distribution execution environment based on network slicing and, more particularly, to technology for generating virtual data center resources in an edge and a core for slice of a network and allocating the virtual data center resources to each terminal (user) service, so as to realize an end-to-end (E2E) virtual network slice environment.

2. Description of the Prior Art

Cloud service (or cloud computing) is technology for providing a data service based on Information Technology (IT) resources virtualized on a network through an Internet technique. Through cloud service, a user can rent IT resources as many as required, such as a storage space and various processing functions (processes) including data classification, calculation, processing, and analysis.

Edge cloud service has platforms and infrastructure under which resources are disposed close to users and the users receive assistance from the cloud. Through the edge cloud service, voluminous data, which cannot be processed at a level of resources actually possessed by the user, can process at a high speed. The edge cloud service provides platform for a high-performance/high-speed data service, so as to allow the user to use the data service through an application program interface (API).

Network slicing technology is for separating one physical network into a plurality of independent virtual networks. Through the network slicing technology, independent network can be provided according to respective service characteristics.

When the network slicing technology is used, E2E networks logically separated from other networks may be generated, so that dedicated network specialized in each of the various services having different characteristics may be provided.

The present disclosure provides a virtual network environment (for example, a vDC) by allocating E2E network slices to respective terminals (users) for supporting a personalized service environment of the terminal (user).

In addition, the present disclosure proposes a hybrid application distribution execution environment based on new network slicing to allow a data service optimized for a communication network used by the terminal (user) to be easily provided (through API exposure) from the virtual network environment (for example, the vDC).

SUMMARY OF THE INVENTION

The present disclosure realizes an E2E virtual network slice environment by generating virtual data center resources in an edge and a core for network slices and allocating the virtual data center resources for respective terminal services.

Further, the present disclosure realizes a hybrid application distribution execution environment based on new network slicing for easily providing (through API exposure) a data service optimized for a communication network used by a terminal.

In accordance with a first aspect of the present disclosure, an application distribution execution system based on network slicing is provided. The application distribution execution system includes: a core cloud node in core network end configured to provide a service based on a core network; and an edge cloud node in an edge network end configured to generate virtual data centers by slicing the core network, allocate application services according to applications to the virtual data centers, respectively, detect an application service according to an application, which can be provided by the edge network end, and an application service according to an application, which can be provided by the core network end, when a terminal is connected, and provide the detected application services to the terminal.

In accordance with a second aspect of the present disclosure, an edge cloud device is provided. The edge cloud device includes: an identification unit configured to identify whether a terminal is connected to an edge network end; and a service management unit configured to, when the terminal is connected to the edge network, detect an application service according to an application, which can be provided by the edge network end, and an application service according to an application, which can be provided by the core network end, and provide the detected application services to the terminal.

The edge cloud device may further include a virtualization unit configured to slice a core network of the core network end, thereby virtual data center being able to be generated.

The service management unit may be configured to register an API address of a first application service corresponding to virtual data centers provided on the edge network end and an AIP address of a second application service corresponding to virtual data centers provided on the core network end.

The service management unit may be configured to detect an API address of a first particular application service, which can be provided by the edge network end, from the API address of the first application service and an API address of a second particular application service, which can be provided by the core network end, from the API address of the second service, based on a result of identification of a communication network type of the radio access network used by the terminal, and provide the detected API addresses to the terminal.

The communication network type of the radio access network may be based on a radio type used when the terminal accesses the edge network end.

In accordance with a third aspect of the present disclosure, a method of operating an edge cloud device is provided. The method includes: an identification step of identifying whether a terminal is connected to an edge network end; and a service management step of, when the terminal is connected to the edge network end, detecting an application service according to an application, which can be provided by the edge network end, and an application service according to an application, which can be provided by a core network end, and providing the detected application services to the terminal.

The method may further include a virtualization step of slicing a core network of the core network end, thereby virtual data center being able to be generated.

The service management step may include registering an API address of a first application service corresponding to virtual data centers provided on the edge network end and an API address of a second application service corresponding to virtual data centers provided on the core network end.

The service management step may include detecting an API address of a first particular application service, which can be provided by the edge network end, from the API address of the first application service and an API address of a second particular application service, which can be provided by the core network end, from the API address of the second service, based on a result of identification of a communication network type of a radio access network used by the terminal, and providing the detected API addresses to the terminal.

The communication network type of the radio access network may be based on a radio type used when the terminal accesses the edge network end.

According to an application distribution execution system based on network slicing, an apparatus applied thereto, and a method of operating the apparatus according to the present disclosure, an E2E virtual network slice environment may be realized by generating virtual data center resources in an edge and a core for network slices and allocating the resources according to each terminal (user) service.

Further, a data service optimized for a communication network used by the terminal (user) may be easily provided (through API exposure), so that the data service may support a personal service environment of the terminal (user) based on an independent virtual network environment.

In addition, a Quality of Service (QoS) for each user/service may be guaranteed, so that entire service satisfaction can be improved.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described with reference to the accompanying drawings.

Figure 1:
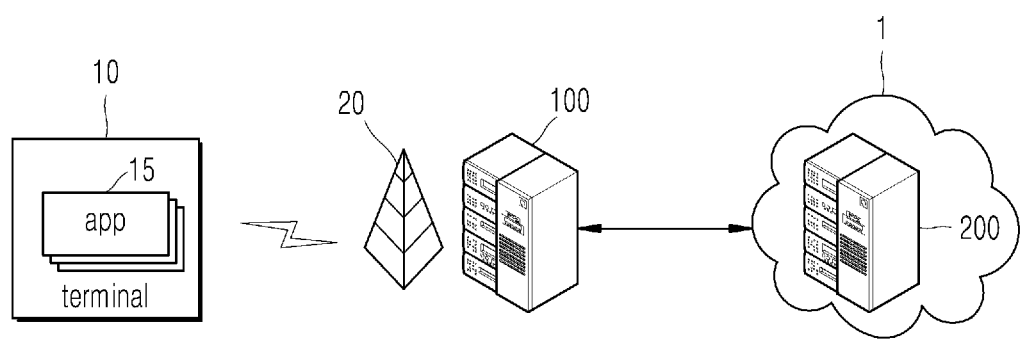
FIG. 1 illustrates a configuration of an application distribution execution system based on network slicing according to an embodiment of the present disclosure.

FIG. 1 illustrates an application distribution execution system based on network slicing according to an embodiment of the present disclosure.

As illustrated in FIG. 1, the application distribution execution system based on network slicing according to an embodiment of the present disclosure is basically a system for providing a cloud service (or cloud computing) through which a data service can be implemented based on Information Technology (IT) resources virtualized on a network.

The cloud service includes an edge cloud service. In the edge cloud service, resources are disposed near users, and the edge cloud service includes a platform and infra for providing assistance of clouding computing. Accordingly, voluminous data, which cannot be accepted with resources actually possessed by the user, can be calculated at a high speed. The edge cloud service provides platform for a high-performance/high-speed data service, so as to allow the user to use the high-performance/high-speed data service through an application program interface (API).

Network slicing technology is for separating one physical network into a plurality of independent virtual networks. Through the network slicing technology, independent network can be provided according to respective service characteristics.

When the network slicing technology is used, E2E networks logically separated from other networks may be generated, so that dedicated network specialized in each of the various services having different characteristics may be provided.

Accordingly, in a hybrid application distribution execution environment based on network slicing according to an embodiment of the present disclosure, it is possible to realize a virtual network environment (for example, a vDC) for each terminal (user) by allocating an E2E core network slices to each terminal (user) to support a personalized service environment of the terminal (user). Further, it is possible to easily provide a data service optimized for a communication network used by the terminal (user) from the virtual network environment (for example, the vDC).

Specifically, an embodiment of the present disclosure proposes an application distribution execution system based on network slicing for realizing a hybrid application distribution execution system based on network slicing.

FIG. 1 illustrates an embodiment of an application distribution execution system based on network slicing according to an embodiment of the present disclosure.

As illustrated in FIG. 1, the application distribution execution system based on network slicing according to an embodiment of the present disclosure includes a core cloud node 200, located at the end of a core network 1 and configured to provide a service based on a core network, and an edge cloud node 100 configured to generate a virtual data center by slicing the core network, allocate the data service (hereinafter, referred to as an application service) according to an application to each virtual data center, detect an application service according to an application, which can be provided by the edge network end, and an application service according to an application, which can be provided by the core network end, when a terminal is connected, and provide the detected application services to a terminal 10.

In the application distribution execution system based on network slicing according to an embodiment of the present disclosure, there may be a device, involved in data transmission/reception, between the edge cloud node 100 and the core cloud node 200, but the device is omitted for convenience of description.

Also, FIG. 1 illustrates one core cloud node 200 and one edge cloud node 100 for distributedly providing a cloud service, but it is only an embodiment briefly illustrated for convenience of description.

In the application distribution execution system based on network slicing according to an embodiment of the present disclosure, the number of core cloud nodes 200 may be one and the number of edge cloud nodes for providing the cloud service may be plural.

However, hereinafter, the case in which the application distribution execution system based on network slicing includes one core cloud node 200 and one edge cloud node 100 will be described for convenience of description.

The core cloud node 200 is located in the core network 1 and provides the cloud service (or cloud computing) for implementing the data service based on virtualized Information Technology (IT) resources.

The IT resources may be storage spaces and various operation processing functions such as data classification, calculation, processing, and analysis. The terminal 10 may use the data service based on the cloud service provided through the IT resources.

The terminal 10 may include a plurality of terminals 10a, 10b. 10c, . . . , and at least one application may be installed in each of the terminals 10a, 10b. 10c.

At this time, the terminal 10 is a device which can use a distributed cloud service provided by the application distribution execution system based on network slicing according to an embodiment of the present disclosure, and may be, for example, a smart phone, a desktop PC, or a tablet PC.

The edge cloud node 100 also provides the cloud service (or cloud computing) for implementing the data service based on virtualized Information Technology (IT) resources.

Particularly, the edge cloud node 100 may be located closer to the terminal 10 than the core cloud node 200. Further, the edge cloud node 100 may slice the core network related to provision of the service by the core cloud node 200 and allocate the sliced core networks to respective terminals 10. Accordingly, a virtual network environment may be implemented from the core network end to the edge network end for each terminal 10 independently. Further, it is possible to easily provide a data service optimized for a communication network used by the terminal. The data service may be provided through API exposure.

Hereinafter, the configuration of the edge cloud node (device) according to an embodiment of the present disclosure will be described in detail. Hereinafter, functions and characteristics of the plurality of terminals 10a, 10b, 10c . . . are the same as each other, so the terminal 10a will be representatively mentioned for convenience of description.

The edge cloud node 100 according to an embodiment of the present disclosure includes an identification unit 110 configured to identify whether the terminal 10a is connected to the edge network end, and a service management unit 120 configured to, when the terminal 10a is connected to the edge network end, detect an application service according to an application, which can be provided by the edge network end, and an application service according to an application, which can be provided by the core network end, and provide the detected application services to the terminal 10a.

The edge cloud node 100 may further include a virtualization unit 130.

The virtualization unit 130 may slice the core network of the core network end 1 and generate virtual data centers.

That is, the virtualization unit 130 generates virtual data centers vDC by slicing the core network and allocates an application service according to an application to each virtual data center vDC.

At this time, the slice of the core network (hereinafter, referred to as a network slice) is allocated to each of the terminals 10 illustrated in FIG. 1 as described above, so that a particular network slice may be allocated to the terminal 10a.

As described above, when the particular network slice is allocated to the terminal 10a, the virtualization unit 130 generates virtual data centers vDC2, vDC3 . . . on the particular network slice allocated to the terminal 10a. This is similar to that the virtual data center vDC1 is provided on the edge cloud node 100.

According to an embodiment of the present disclosure, although it is illustrated that one virtual data center vDC1 is provided on the edge cloud node 100, the present disclosure is not limited thereto and two or more virtual data centers vDC1 may be provided on the edge cloud node 100 depending on settings by an operator.

When the virtual data centers vDC2 and vDC3 have been generated on the particular network slice, the virtualization unit 130 identifies user context from a pre-stored personalized service environment of the terminal 10a.

The personalized service environment may correspond to all environmental elements related to execution of the application service according to the application by the terminal. Software resources and hardware resources may be examples of the environmental elements.

The virtualization unit 130 may identify application services of all applications installed in the terminal 10a on the basis of user context.

Thereafter, the virtualization unit 130 allocates application services of the terminal 10a to the virtual datacenter vDC1 of the edge cloud node 100 and the virtual data centers vDC2 and vDC3 on the particular network slice within the core cloud node 200, respectively. Hereinafter, it is assumed that three applications are installed in the terminal 10a.

As described above, when the application services have been allocated to the virtual data centers vDC1, vDC2, and vDC3, the edge cloud node 100 for providing the service in the edge network end is connected to the core cloud node 200 for providing the service in the core network end and thus an independent virtual network environment is realized for the terminal 10a.

When the independent virtual network environment of the terminal 10a is realized through the connection between the core network end and the edge network end, virtual resources on the independent virtual network environment may be efficiently disposed to be optimized for the personalized service environment of the terminal 10a, so that efficiency of the use of resources may be generally improved.

Although it has been described that three virtual data centers vDC1, vDC2, and vDC3 are provided in the independent virtual network environment of the terminal 10a, the present disclosure is not limited thereto, and the virtual data center may be flexibly generated and removed according to the number of applications installed in the terminal 10 and resources (virtualized server resources or virtualized network resources) of the independent virtual network environment.

When virtual data centers vDC4, vDC5 . . . are generated for different terminals 10b, 10c . . . , respectively, through the method as described above and application services are allocated, an independent virtual network environment for each of the remaining terminals 10b, 10c . . . may be further realized.

Meanwhile, the identification unit 110 identifies whether the terminal is connected to the edge network end.

Specifically, the identification unit 110 may identify a connection of a terminal, which can be connected through a preset authentication process, through a link with a terminal connected to the edge network end. Alternatively, the identification unit 110 may identify whether a terminal, which can be connected without any authentication process, is connected.

Hereinafter, as described above, the case in which the terminal 10a is connected to the edge network end will be described.

At this time, the connection of the terminal 10a to the edge cloud node 100 is performed based on a Radio Network Information Service (RNIS) that satisfies MEC Spec within the virtualization unit. A search function may be a search function provided by the RNIS or a search function provided by another service.

When the terminal 10a is connected to the edge cloud node 100 by the radio access network, the identification unit 110 may identify a type of a communication network (for example, 5G or Wi-Fi) of the radio access network used when the terminal 10a is connected to the edge network, more specifically, the identification unit 110 within the edge cloud node 100 through a Base Station (BS) 20.

At this time, the radio access network also can be sliced like the above-described core network. For example, the slicing may be performed for each network radio type, for each user, or both for each radio type and each user. Accordingly, another communication network (for example, 5G or Wi-Fi) may be allocated to the radio type.

For example, when the radio access network is sliced into three slices, so that a first communication network (5G) is allocated to a first E2E service slice, a second communication network (Wi-Fi) is allocated to a second E2E service slice, and a third communication network (LTE) is allocated to a third E2E service slice, if the terminal 10a is connected to the edge network end through the first communication network (5G) allocated to the first E2E service slice, the identification unit 110 may identify that the communication network type of the radio access network is the first communication network (5G).

Similarly, when the terminal 10a is connected to the edge network end through the second communication network (Wi-Fi)/third communication network (LTE) allocated to the second E2E service slice/third E2E service slice, the identification unit 110 may identify that the communication network type of the radio access network is the second communication network (Wi-Fi)/third communication network (LTE).

The service management unit 120 easily provide (through API exposure) the data service optimized for the communication network used by the terminal.

Specifically, when the terminal 10a is connected to the edge network end, the service management unit 120 detects an application service according to an application, which can be provided by the edge network end, and an application service according to application, which can be provided by the core network end, based on a result of the identification of the communication network type of the radio access network used by the terminal 10a.

To this end, API addresses of the virtual data centers vDC1, vDC2, and vDC3 provided on the independent virtual network environment of the terminal 10a should be known in advance. In this case, the application service, which can be provided by the virtual data center vDC1 included in the edge cloud node 100 of the edge network end, and the application service, which can be provided by the core cloud node 200 of the core network end, more specifically, the virtual data centers vDC2 and vDC3 provided on the particular network slice can be detected.

Accordingly, when each of all application services of the terminal 10a is allocated to each of the virtual data centers vDC1, vDC2, and vDC3 and thus the independent virtual network environment of the terminal 10a is realized, the service management unit 120 registers API address 1 of a first application service corresponding to the virtual data center vDC1 included in the edge cloud node 100 of the edge network end and API addresses 2 and 3 of a second application service corresponding to the core cloud node 200 of the core network end, more specifically, the virtual data centers vDC2 and vDC3 provided on the particular network slice.

That is, before the terminal 10a is connected to the edge network end, API address 1 of the first application service and API addresses 2 and 3 of the second application service corresponding to the virtual data centers vDC1, vDC2, and vDC3 are stored in advance.

When the terminal 10a is connected to the edge network end after the API address for each of the virtual data centers vDC1, vDC2, and vDC3 is registered (stored) in advance, an API address of a particular application service, which can be provided by the edge network/core network end, is detected from the registered API addresses on the basis of a result of the identification of the communication network type of the radio access network used by the terminal 10a.

That is, an API address of a first particular application service, which can be provided by the edge network end, is detected from API address 1 of the first application service and API address of a second particular application service, which can be provided by the core network end, are detected from API addresses 2 and 3 of the second application service based on the result of the identification of the communication network type of the radio access network used by the terminal.

Specifically, it has been mentioned that the communication network type (for example, 5G or Wi-Fi) of the radio access network is determined according to the communication network (for example, 5G or Wi-Fi) allocated for each E2E service slice.

That is, it may be identified that the communication network type of the radio access network is the first communication network (5G) when the terminal 10a is connected to the edge network end through the first communication network (5G) allocated to the first E2E service slice, it may be identified that the communication network type of the radio access network is the second communication network (Wi-Fi) when the terminal 10a is connected to the edge network end through the second communication network (Wi-Fi) allocated to the second E2E service slice, and it may be identified that the communication network type of the radio access network is the third communication network (LTE) when the terminal 10a is connected to the edge network end through the third communication network (LTE) allocated to the third E2E service slice.

As described above, when the communication network type of the radio access network is identified, Quality of Service (QoS) that can be guaranteed in the communication network type of the radio access network can be identified.

For example, when the communication network type of the radio access network used by the terminal 10a is the first communication network (5G), the terminal 10a may be connected to the edge network end through the first communication network (5G) allocated to the first E2E service slice and a first QoS preset to the first communication network (5G) may be identified.

Accordingly, the service management unit 120 may detect API address 1 of the first application service corresponding to the virtual data center vDC1 as API address 1 of the first particular application service which can be provided by the edge network end and detect API addresses 2 and 3 of the second application service corresponding to the virtual data centers vDC2 and vDC3 as API addresses 2 and 3 of the second particular application which can be provided by the core network end in order to satisfy the first QoS preset to the first communication network (5G).

In another example in the same way, the service management unit 120 may detect API address 1 of the first application service corresponding to the virtual data center vDC1 as the API address of the first particular application service which can be provided by the edge network end and detect API address 2 of the second application service corresponding to the virtual data center vDC2 as API address 2 of the second particular application which can be provided by the core network end in order to satisfy the second QoS preset to the second communication network (Wi-Fi).

As described above, when the API address of the first particular application service which can be provided by the edge network end and the API address of the second particular application service which can be provided by the core network end are detected on the basis of the QoS preset according to the communication network type of the radio access network, the service management unit 120 lists the detected API address of the first particular application service and the detected API address of the second particular application service (hereinafter, referred to as an API address list) and provide the list to the terminal 10*a* (through API exposure).

That is, the service management unit 120 may provide the API address list to the terminal 10*a* according to distribution scheduling (through API exposure). Accordingly, the terminal 10*a* can receive a list of optimal API addresses which can be connected according to a communication network through an independent virtual network environment that reflects a personalized service environment of the terminal 10*a*.

As described above, according to an embodiment of the present disclosure, when the independent virtual network environment for each terminal (user) is realized (configured) on the basis of the network slicing technology, the edge cloud node 100 of the edge network end may be expanded to resources of the core network end and thus provide the application service for supporting the personalized service environment of the terminal (user). Further, the optimized data service according to the QoS that should be guaranteed in the communication network used by the terminal may be easily provided to the terminal (user) from the independent virtual network environment (through API exposure).

In addition, according to an embodiment of the present disclosure, a super low latency data service/a larger data service may be provided according to each user and each service by expanding resources which can be used by the edge cloud node 100 and providing the optimized data service according to the QoS (through API exposure).

Figure 3:
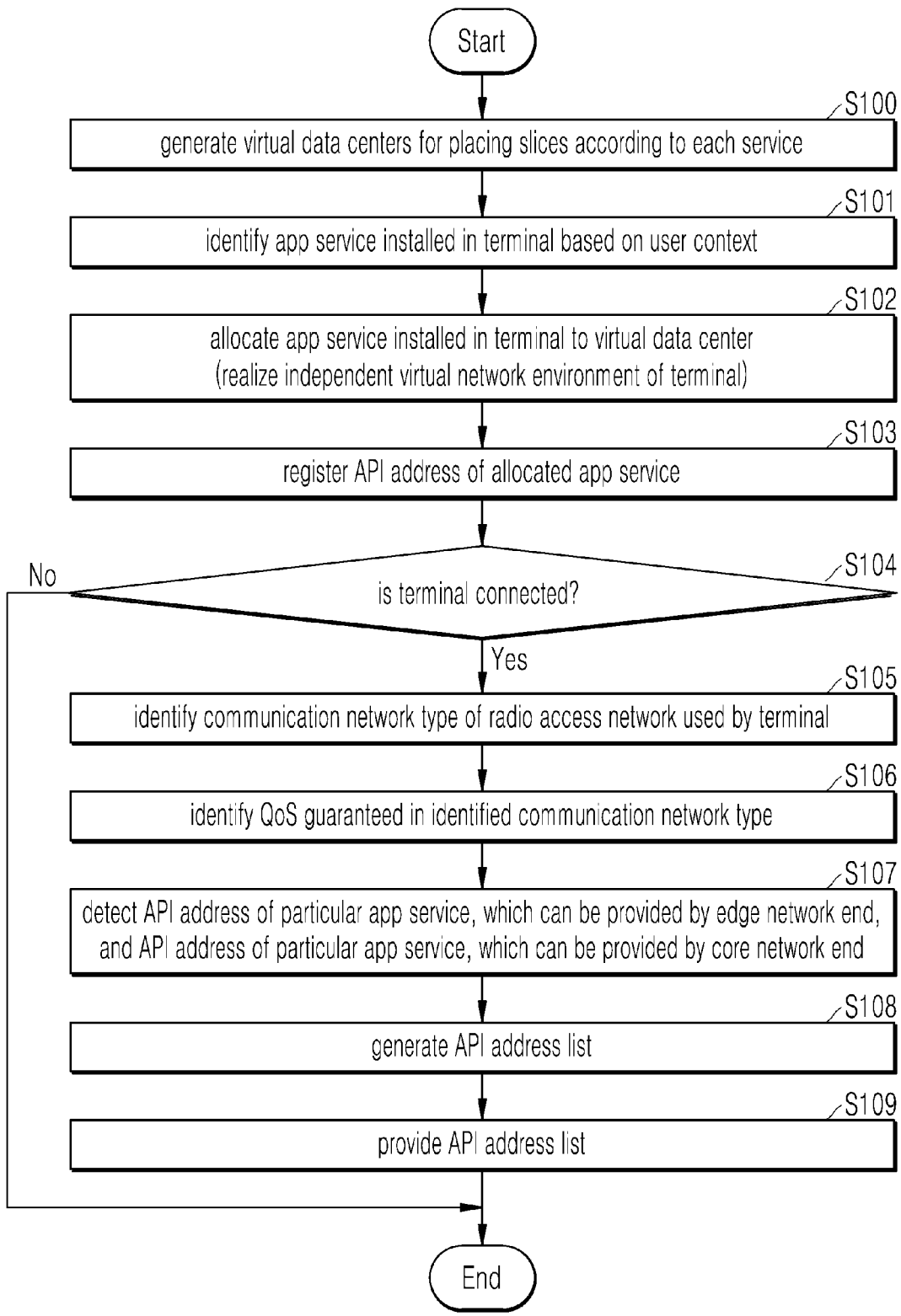
FIG. 3 is a flowchart illustrating an operation in a method of operating the edge cloud node (device) according to an embodiment of the present disclosure.

Hereinafter, a method of operating the edge cloud node (device) according to an embodiment of the present disclosure will be described with reference to FIG. 3.

Figure 2:
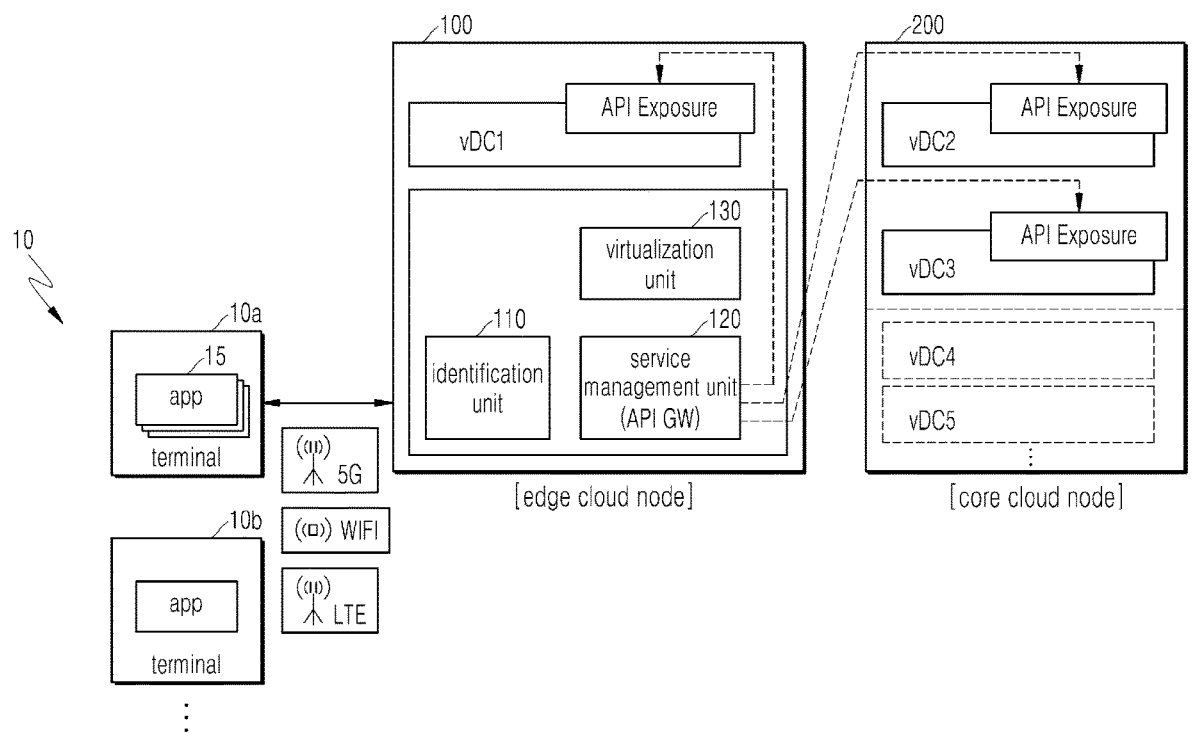
FIG. 2 is a block diagram illustrating a detailed configuration of an edge cloud node (device) according to an embodiment of the present disclosure.

For convenience of description, the elements illustrated in FIGS. 1 and 2 will be mentioned using the corresponding reference numerals, and the terminal 10*a* is representatively used as the terminal.

According to the method of operating the edge cloud node 100 according to an embodiment of the present disclosure, the core network in the end of the core network 1 is sliced and thus virtual data centers are generated in S100.

At this time, the slice of the core network (hereinafter, referred to as a network slice) is allocated to each of the terminals 10 illustrated in FIG. 1 as described above, so that a particular network slice may be allocated to the terminal 10*a*.

When the particular network slice is allocated to the terminal 10*a*, virtual data centers vDC2, vDC3 . . . may be generated on the particular network slice allocated to the terminal 10*a* as a virtual data center vDC1 is provided on the edge cloud node 100 in the method of operating the edge cloud node 100 according to an embodiment of the present disclosure.

When the virtual data centers vDC2, vDC3 . . . have been completely generated on the particular network slice, the edge cloud node 100 identifies user context from a pre-stored personalized service environment of the terminal 10*a*.

The personalized service environment may correspond to all environmental elements (software resources, hardware resources, and the like) related to execution of the application service according to the application by the terminal.

The edge cloud node 100 may identify application services of all applications installed in the terminal 10*a* on the basis of user context in S101.

Thereafter, according to the method of operating the edge cloud node 100 according to an embodiment of the present disclosure, the application services of the terminal 10*a* are allocated to the virtual datacenter vDC1 of the edge cloud node 100 and the virtual data centers vDC2 and vDC3 on the particular network slice within the core cloud node 200, respectively. Hereinafter, it is assumed that three applications are installed in the terminal 10*a*.

As described above, when the application services have been completely allocated to the virtual data centers vDC1, vDC2, and vDC3, the edge cloud node 100 for providing the service in the edge network end is connected to the core cloud node 200 for providing the server in the core network end and thus an independent virtual network environment of the terminal 10*a* is realized in S102.

When the independent virtual network environment of the terminal 10 is realized through the connection between the core network end and the edge network end, virtual resources on the independent virtual network environment may be efficiently located to be optimized for the personalized service environment of the terminal 10*a*, so that efficiency of the use of resources may be generally improved.

When virtual data centers vDC4, vDC5 . . . are generated for different terminals 10*b*, 10*c* . . . , respectively, through the same method described above and application services are allocated to the terminals, an independent virtual network environment for each of the remaining terminals 10*b*, 10*c* . . . may be further realized.

Thereafter, in the method of operating the edge cloud node 100 according to an embodiment of the present disclosure, API addresses of the virtual data centers vDC1, vDC2, and vDC3 provided on the independent virtual network environment of the terminal 10*a* should be known in advance. In this case, the application service, which can be provided by the virtual data center vDC1 included in the edge cloud node 100 of the edge network end, and the application service, which can be provided by the virtual data centers vDC2 and vDC3 included in the core cloud node 200 in the core network end, more specifically, provided on the particular network slice can be detected.

The edge cloud node 100 registers API address 1 of a first application service corresponding to the virtual data center vDC1 included in the edge cloud node 100 of the edge network end and API addresses 2 and 3 of a second application service corresponding to the virtual data centers vDC2 and vDC3 included in the core cloud node 200 of the core network end, more specifically, provided on the particular network slice in S103.

That is, in the method of operating the edge cloud node 100 according to an embodiment of the present disclosure, before the terminal 10a is connected to the edge network end, that is, when the independent virtual network environment is realized, API address 1 of the first application service and API addresses 2 and 3 of the second application service corresponding to the virtual data centers vDC1, vDC2, and vDC3 are stored in advance.

As described above, when the API address for each of the virtual data centers vDC1, vDC2, and vDC3 is registered (stored) in advance, the edge cloud node 100 identifies whether the terminal is connected to the edge network end in S104.

When the terminal 10a is connected to the edge network end (Yes of S104), the edge cloud node 100 detects an application service according to an application, which can be provided by the edge network end, and an application service according to application, which can be provided by the core network end, based on a result of the identification of the communication network type of the radio access network used by the terminal 10a in S105 to S107.

That is, when the communication network type of the radio access network is identified, the edge cloud node 100 may secure a radio channel for each user, guaranteed in the communication network type of the radio access network and a Quality of Service (QoS) of the service belonging to the slice of the core.

For example, when the communication network type of the radio access network used by the terminal 10a is the first communication network (5G), the terminal 10a may be connected to the edge network end through the first communication network (5G) and a first QoS preset for a user slice allocated to the first communication network (5G) may be identified.

In the method of operating the edge cloud node 100 according to an embodiment of the present disclosure, API address 1 of the first application service located in the virtual data center vDC1 may be detected as API address 1 of the first particular application service, which can be provided by the edge network end, and API addresses 2 and 3 of the second application service corresponding to the virtual data centers vDC2 and vDC3 may be detected as API addresses 2 and 3 of the second particular application service, which can be provided by the core network end, for the service for each user in order to satisfy the first QoS preset to the first communication network (5G).

In another example, when the communication network type of the radio access network used by the terminal 10a is the second communication network (Wi-Fi), the terminal 10a may be connected to the edge network end through the second communication network (Wi-Fi) allocated to the second E2E service slice and it may be identified that the second QoS preset to the second communication network (Wi-Fi) is less guaranteed than the first QoS.

In the method of operating the edge cloud node 100 according to an embodiment of the present disclosure, API address 1 of the first application service corresponding to the virtual data center vDC1 may be detected as API address 1 of the first particular application service which can be provided by the edge network end and API address 2 of the second application service corresponding to the virtual data center vDC2 may be detected as API address 2 of the second particular application service which can be provided by the core network end in order to satisfy the second QoS preset to the second communication network (Wi-Fi).

As a result, in the method of operating the edge cloud node 100 according to an embodiment of the present disclosure, an API address of a first particular application service, which can be provided by the edge network end, is detected from API address 1 of the first application service and API address of a second particular application service, which can be provided by the core network end, are detected from API addresses 2 and 3 of the second application service, based on the result of the identification of the communication network type of the radio access network used by the terminal.

As described above, when the API address of the particular application service, which can be provided by the edge network/core network end, is detected among the pre-registered (pre-stored) API addresses, the edge cloud node 100 lists the API address of the first particular application, which can be provided by the edge network end, and the API address of the second particular application service, which can be provided by the core network end, (hereinafter, referred to as an API address list) and provide the list to the terminal 10a (through API exposure) in S108 and S109.

That is, in the method of operating the edge cloud node 100 according to an embodiment of the present disclosure, the API address list is provided to the terminal 10a according to distribution scheduling (through API exposure). Accordingly, the terminal 10a can receive the list of optimal API addresses which can be connected according to a communication network through an independent virtual network environment that reflects a personalized service environment of the terminal 10a.

As described above, according to the application distribution execution system based on network slicing, the apparatus applied thereto, and the method of operating the apparatus, an E2E virtual network slice environment may be realized by generating virtual data center resources in an edge and a core for network slices and allocating the resources according to each terminal (user) service. Further, a data service optimized for a communication network used by the terminal (user) may be easily provided (through API exposure), so that the data service may support a personal service environment of the terminal (user) based on an independent virtual network environment. In addition, a Quality of Service (QoS) for each user/service may be guaranteed, so that entire service satisfaction can be improved.

A method of operating an edge cloud node (device) according to an embodiment of the present disclosure can be implemented in a form of a program instruction, which can be executed through various computer means, and recorded in a computer-readable medium. The computer readable medium may include a program command, a data file, a data structure, and the like independently or in combination. The program command recorded in the medium may be things specially designed and configured for the present disclosure, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware device may be configured to operate as one or more software modules in order to perform operations of the present disclosure, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure.

What is claimed is:

1. An application distribution execution system based on network slicing, the application distribution execution system comprising:
    a core cloud node in a core network end of a core network; and
    an edge cloud node device in an edge network end, the edge cloud node device comprising:
        a processor, and
        a memory storing program instructions that, when executed by the processor, cause the processor to:
            generate virtual data centers by slicing the core network,
            allocate application services according to applications to the virtual data centers, respectively,
            detect an application service according to an application of the edge network end and an application service according to an application of the core network end, when a terminal is connected, and
            provide the detected application services to the terminal.

2. An edge cloud device comprising:
    a processor, and
    a memory storing program instructions that, when executed by the processor, cause the the processor to:
        slice a core network, thereby generating virtual data centers;
        allocate application services according to applications to the virtual data centers, respectively;
        identify whether a terminal is connected to an edge network end;
        when the terminal is connected to the edge network, detect an application service according to an application of the edge network end, and an application service according to an application of a core network end of the core network; and
        provide the detected application services to the terminal.

3. The edge cloud device of claim 2, wherein the processor is configured to register an API address of a first application service corresponding to a virtual data center, among the virtual data centers, of the edge network end and an API address of a second application service corresponding to a virtual data center of the core network end.

4. The edge cloud device of claim 3, wherein the processor is configured to
    detect an API address of a first particular application service, which can be provided by the edge network end, from the API address of the first application service and an API address of a second particular application service, which can be provided by the core network end, from the API address of the second service, based on a result of identification of a communication network type of a radio access network used by the terminal, and
    provide the detected API addresses to the terminal.

5. The edge cloud device of claim 4, wherein the communication network type of the radio access network is determined based on a radio type used by the terminal when the terminal accesses the edge network end.

6. A method of operating an edge cloud device, the method comprising:
    slicing a core network, thereby generating virtual data centers;
    allocating application services according to applications to the virtual data centers, respectively;
    identifying whether a terminal is connected to an edge network end;
    detecting, when the terminal is connected to the edge network end, an application service according to an application of the edge network end, and an application service according to an application of a core network end of the core network; and
    providing the detected application services to the terminal.

7. The method of claim 6, further comprising registering an API address of a first application service corresponding to a virtual data center, among the virtual data centers, of the edge network end and API addresses of a second application service corresponding to a virtual data center of the core network end.

8. The method of claim 7, wherein the detecting comprises detecting an API address of a first particular application service, which can be provided by the edge network end, from the API address of the first application service and an API address of a second particular application service, which can be provided by the core network end, from the API address of the second service, based on a result of identification of a communication network type of a radio access network used by the terminal, and the providing comprises providing the detected API addresses to the terminal.

9. The method of claim 8, wherein the communication network type of the radio access network is based on a radio type used when the terminal accesses the edge network end.

* * * * *